United States Patent
Zhou et al.

(10) Patent No.: US 9,260,340 B2
(45) Date of Patent: Feb. 16, 2016

(54) LUMINOUS NANO-GLASS-CERAMICS USED AS WHITE LED SOURCE AND PREPARING METHOD OF LUMINOUS NANO-GLASS-CERAMICS

(75) Inventors: Mingjie Zhou, Guangdong (CN); Yanbo Qiao, Guangdong (CN); Wenbo Ma, Guangdong (CN); Danping Chen, Guangdong (CN)

(73) Assignee: Ocean's King Lighting Science & Technology Co., Ltd., Guangdong (CN)

( * ) Notice: Subject to any disclaimer, the term of this patent is extended or adjusted under 35 U.S.C. 154(b) by 823 days.

(21) Appl. No.: 13/582,501

(22) PCT Filed: Mar. 5, 2010

(86) PCT No.: PCT/CN2010/070880
§ 371 (c)(1),
(2), (4) Date: Sep. 4, 2012

(87) PCT Pub. No.: WO2011/106938
PCT Pub. Date: Sep. 9, 2011

(65) Prior Publication Data
US 2012/0319045 A1    Dec. 20, 2012

(51) Int. Cl.
| | |
|---|---|
| *C03C 4/12* | (2006.01) |
| *C03C 3/06* | (2006.01) |
| *C03C 14/00* | (2006.01) |
| *C04B 35/44* | (2006.01) |
| *C09K 11/77* | (2006.01) |

(52) U.S. Cl.
CPC ... *C03C 3/06* (2013.01); *C03C 4/12* (2013.01); *C03C 14/006* (2013.01); *C04B 35/44* (2013.01); *C09K 11/7774* (2013.01); *C03C 2201/10* (2013.01); *C03C 2201/32* (2013.01); *C03C 2214/16* (2013.01); *C03C 2214/20* (2013.01); *C03C 2214/32* (2013.01); *C04B 2235/3224* (2013.01); *C04B 2235/3225* (2013.01); *C04B 2235/3229* (2013.01); *C04B 2235/764* (2013.01)

(58) Field of Classification Search
CPC .......... C03C 4/12; C03C 3/06; C03C 14/006; C09K 11/7774
See application file for complete search history.

(56) References Cited

FOREIGN PATENT DOCUMENTS

| | | |
|---|---|---|
| CN | 1591921 A | 3/2005 |
| CN | 1618760 A | 5/2005 |
| CN | 1736920 A | 2/2006 |
| CN | 101643315 A | 2/2010 |
| WO | 2004/050576 A1 | 6/2004 |

OTHER PUBLICATIONS

International Search Report for corresponding International Application No. PCT/CN2010/070880 mailed Dec. 16, 2010.

*Primary Examiner* — Carol M Koslow
(74) *Attorney, Agent, or Firm* — Renner, Otto, Boisselle & Sklar, LLP

(57) ABSTRACT

A luminous nano-glass-ceramics used as white LED source and the preparing method of nano-glass-ceramics are provided. The glass is a kind of non-porous compact $SiO_2$ glass in which luminous nano-microcrystalites are dispersed. The luminous nano-microcrystalite has the chemical formula of $Y_xGd_{3-x}Al_5O_{12}$:Ce, wherein $0 \leq x \leq 3$. The stability of the said glass is good and its irradiance is uniform. The preparing method comprises the following steps: dissolving the compound raw materials in the solvent to form mixed solution, dipping the nano-microporous $SiO_2$ glass in the solution, taking it out and air drying, sintering at the temperature of 1100-1300° C. for 1-5 hours by stage heating, and obtaining the product. The method has a simple process, convenient operation and low cost.

10 Claims, 1 Drawing Sheet

LUMINOUS NANO-GLASS-CERAMICS USED AS WHITE LED SOURCE AND PREPARING METHOD OF LUMINOUS NANO-GLASS-CERAMICS

This application is a national phase of International Application No. PCT/CN2010/070880 filed Mar. 5, 2010.

FIELD OF THE INVENTION

The present invention belongs to the illumination and photo-electronic field, and relates to a luminescent glass and a method for the preparation thereof, and specifically relates to a luminescent nano-crystalline glass for white LED source, and a method for the preparation thereof.

BACKGROUND OF THE INVENTION

As light emitting diode (LED) has advantages such as long life, low energy consumption, and quick start, LED devices have been widely used in fields such as signal lights, automobile lights, large screen display and illumination. At present, the most commonly used white LED achieves white light by combining blue LED chips with fluorescent powders. The mechanism thereof is: blue light chips stimulate the fluorescent powders to emit yellow light, and blue light and yellow light complement with each other to produce a visible white light. The fluorescent powders currently used for white LED are mainly cerium-doped yttrium aluminum garnet (YAG:Ce) fluorescent powder, silicate fluorescent powder, nitride fluorescent powder, and the like, among which the YAG:Ce fluorescent powder is the most widely used. However, it is difficult to control the shape and particle size of the fluorescent powder, which leads to a high cost for manufacturing high-quality fluorescent powder for white LED. In addition, during the encapsulating process, fluorescent powder should be mixed with glue. In the mixture of fluorescent powder with glue, due to the poor compatibility of the two components, fluorescent powder tends to precipitate, resulting in non-uniform distribution of the glue, which in turn results in poor uniformity of the light emission of the LED device, and poor color tone consistency. This leads to a high cost of light separation for white LED. Due to the high cost and inconsistent property, the white LED materials used in many encapsulating factories in China still rely on importation.

SUMMARY OF THE INVENTION

The technical problem to be solved by the present invention is to overcome the defects in the prior art by providing a luminescent nano-crystalline glass for white LED source which has good stability, low cost, and uniform light emission.

The technical problem to be further solved by the present invention is to provide a method for manufacturing a luminescent nano-crystalline glass for white LED source, which is simple and facile, and the product thereof has stable qualities.

The technical solution of the present invention to solve the technical problem is: a luminescent nano-crystalline glass for white LED source, which is a non-porous compacted $SiO_2$ glass in which $Y_xGd_{3-x}Al_5O_{12}$:Ce luminescent nano-crystallites are disperse, wherein $0 \leq x \leq 3$.

In the luminescent nano-crystalline glass for white LED source, the luminescent nano-crystalline glass is produced by using a $SiO_2$ nano-porous glass as a substrate, and soaking the $SiO_2$ nano-porous glass in a solution containing ions for $Y_xGd_{3-x}Al_5O_{12}$:Ce. After the soaked $SiO_2$ nano-porous glass is sintered, the pores shrink to form a non-porous compacted $SiO_2$ glass encapsulating $Y_xGd_{3-x}Al_5O_{12}$:Ce luminescent nano-crystallites.

In one embodiment, the volume of the pores in the $SiO_2$ nano-porous glass represents 25~40% of the total volume of the $SiO_2$ nano-porous glass.

In one embodiment, the $SiO_2$ nano-porous glass is substantially composed of the following components in weight parts:

| | |
|---|---|
| $SiO_2$ | 94.0~98.0 |
| $B_2O_3$ | 1.0~3.0 |
| $Al_2O_3$ | 1.0~3.0 |

The method for manufacturing the luminescent nano-crystalline glass for white LED source comprises the following steps:

(1) using at least one of oxides, nitrates, chlorides, sulfates, acetates of $Y^{3+}$ and $Gd^{3+}$; at least one of oxides, nitrates, chlorides, sulfates, acetates of $Al^{3+}$; and at least one of oxides, nitrates, chlorides, sulfates, acetates of $Ce^{3+}$ as raw materials, dissolving the raw materials in a solvent to prepare a mixed solution of ions of luminescent compounds, wherein the concentration of $Al^{3+}$ is 0.5~2 mol/L, the sum of the concentrations of $Y^{3+}$ and $Gd^{3+}$ is 0.3~1.2 mol/L, and the concentration of $Ce^{3+}$ is 0.001~0.2 mol/L;

(2) selecting a $SiO_2$ nano-porous glass having interconnected pores as a substrate, wherein the volume of the pores in the $SiO_2$ nano-porous glass represents 25~40% of the total volume of the $SiO_2$ nano-porous glass; and placing the $SiO_2$ nano-porous glass into the mixed solution obtained in step (1) and soaking for above 10 minutes;

(3) gradually heating the soaked $SiO_2$ nano-porous glass to 1100~1300° C. and sintering for 1~5 hours, to give the luminescent nano-crystalline glass for white LED source.

In the method for manufacturing the luminescent nano-crystalline glass for white LED source, when the raw materials are oxides of various ions, the solvent may be nitric acid, hydrochloric acid, sulfuric acid or acetic acid; when the raw materials are nitrates, chlorides, sulfates or acetates of various ions, the solvent may be water.

In the method for manufacturing the luminescent nano-crystalline glass for white LED source, in step (2), the $SiO_2$ nano-porous glass is placed into the mixed solution obtained in step (1) and soaked for 30 min~5 h.

In the method for manufacturing the luminescent nano-crystalline glass for white LED source, in step (3), the soaked $SiO_2$ nano-porous glass is first air-dried under room temperature until the surface thereof becomes dry, and then placed in an oven and gradually heated up to 1150~1250° C., and sintered at the same temperature for 2~4 hours, cooled down with the oven to room temperature, and taken out to obtain the luminescent nano-crystalline glass for white LED source. In the temperature ranges of below 400° C. and above 900° C., the heating rate shall be no higher than 15° C./min.

In the method for manufacturing the luminescent nano-crystalline glass for white LED source, the $SiO_2$ nano-porous glass is substantially composed of the following components in weight parts: $SiO_2$ 94.0~98.0, $B_2O_3$ 1.0~3.0, and $Al_2O_3$ 1.0~3.0.

The luminescent nano-crystalline glass of the present invention has $Y_xGd_{3-x}Al_5O_{12}$:Ce luminescent nano-crystallites dispersed therein, and can emit yellow light under the stimulation of blue light, and can be used as a white LED source. In addition, $Y_xGd_{3-x}Al_5O_{12}$:Ce luminescent nano-crystallites can be well dispersed in glass, which effectively lowers the non-radiation transition of luminescent ions in the glass and avoids concentration quenching effect caused by clusters. Furthermore, the volume of the pores represents 25~40% of the total volume of the $SiO_2$ nano-porous glass, ensuring a sufficient amount of luminescent particles in the pores, and leading to good luminescent properties of the glass of the present invention. Furthermore, this kind of nano-porous glass substrate has good transparency for ultra-violet lights, which favors the absorption of stimulating lights by the luminescent particles, and thereby improves the luminescent efficiency.

$SiO_2$ nano-porous glass is used in the present invention as a substrate. Porous $SiO_2$ nano-porous glass material is suitable for preparing nano-materials. In particular, $SiO_2$ nano-porous glass is transparent in the visible light range, and therefore may be used as a substrate material for optically functional nano-particles. Due to the special pore structure of the $SiO_2$ nano-porous glass, luminescent particles in nano-scale may be prepared through the pores. During the sintering of the $SiO_2$ nano-porous glass, the pores shrink to encapsulate the luminescent particles, forming a compacted, non-porous, transparent nano-crystalline glass with high mechanical strength. In addition, as the luminescent particles are encapsulated in the glass, the product can be kept stable for a long time.

The luminescent nano-crystalline glass of the present invention has a high content of $SiO_2$, similar to that in quartz. Also similar to quartz, the luminescent nano-crystalline glass of the present invention has excellent physical and chemical properties, such as good chemical stability, high mechanical strength, low thermal expansion coefficient, resistance to thermal shock, and the like. These excellent properties render that the glass of the present invention may be used in many special fields, especially in severe environments, such as illumination and display in high-temperature, high-pressure, high-vibration and humid environments; high-power, high repetation frequency solid state laser field; long-term outdoor solar energy material field; and the like.

In the process of manufacturing the luminescent glass by conventional high temperature melting, the compounds in the glass formation have high chemical activities, which would readily lead to the reaction between the compounds in the glass formation and the nano-particles, resulting in difficulties in preparing mono-dispersed luminescent nano-particles. In the present invention, the luminescent ions are introduced by soaking the $SiO_2$ nano-porous glass into a solution of the active ions, and a high-temperature solid-state sintering is carried out at 1100~1300° C., which overcome the difficulties for preparing mono-dispersed luminescent nano-particles in quartz. The present invention gives a luminescent nano-crystalline glass with homogenous mono-dispersion, and provides a new route for preparing nano-materials, in particular a new method for preparing a luminescent nano-crystalline transparent glass material.

The $Y_xGd_{3-x}Al_5O_{12}$:Ce luminescent nano-crystalline glass of the present invention has advantages such as simple preparation process, reliable product properties, and low cost. White LED encapsulation with this new luminescent material may solve many problems relating to the currently used mixed encapsulation of fluorescent powders and glue, and therefore has a great value for investment and a broad market of application.

DETAILED DESCRIPTION OF PREFERRED EMBODIMENTS

Example 1

$Y_3Al_5O_{12}$:Ce nano-crystalline glass is a non-porous compacted $SiO_2$ glass having luminescent nano-crystallites of formula $Y_3Al_5O_{12}$:Ce dispersed therein.

Figure 1:
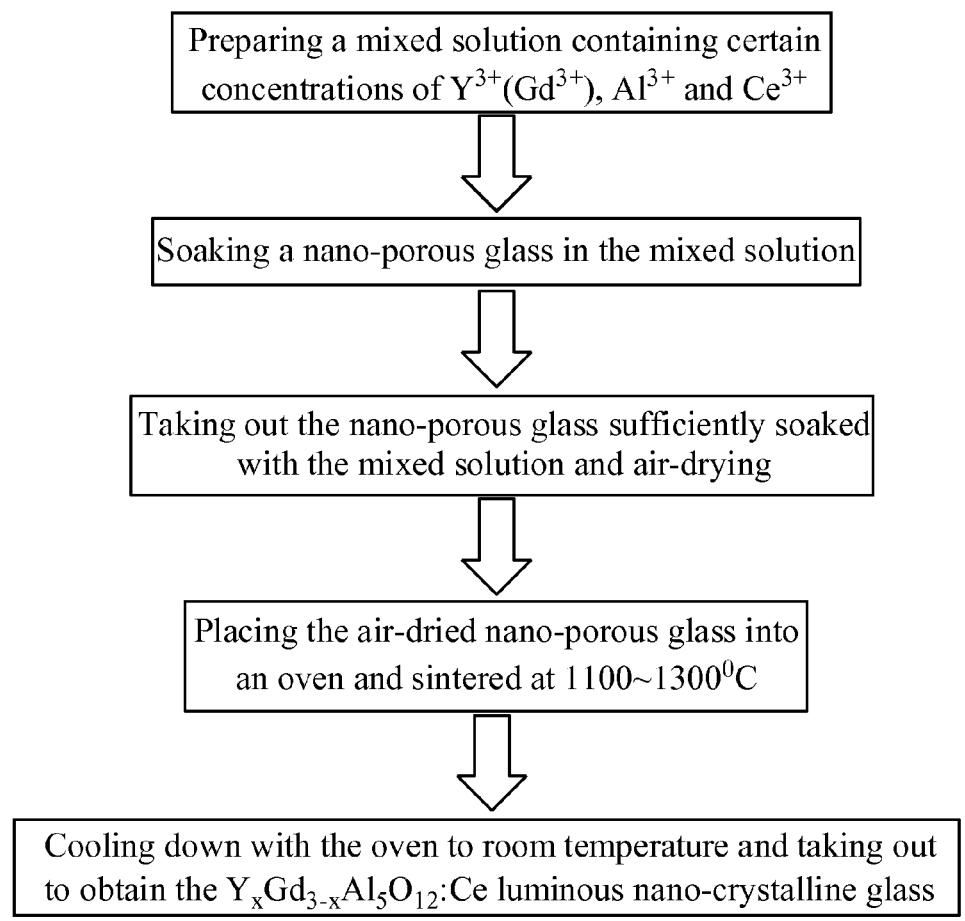
FIG. 1 is flow chart for manufacturing $Y_xGd_{3-x}Al_5O_{12}$:Ce luminescent nano-crystalline glass.
Figure 2:
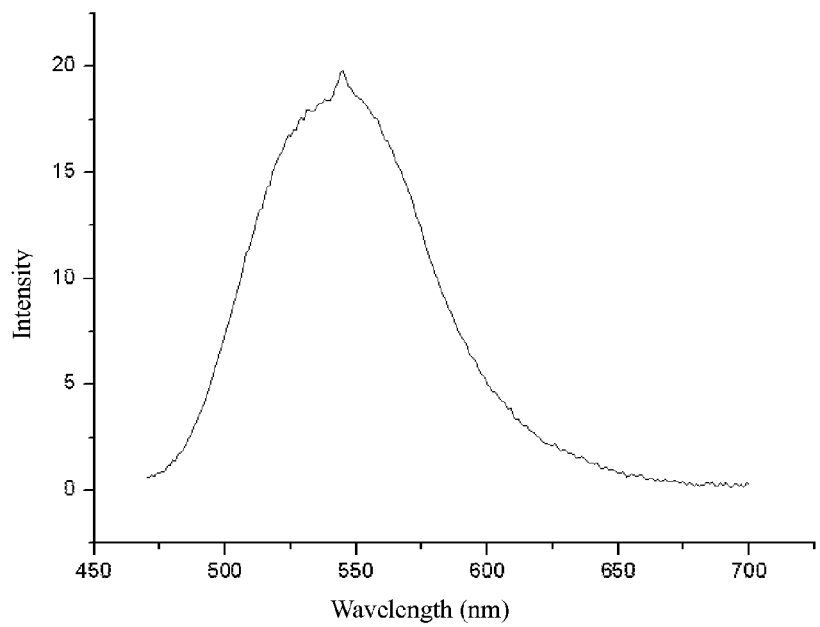
FIG. 2 is the emission spectrum of the $Y_3Al_5O_{12}$:Ce nano-crystalline glass obtained in Example 1 under the stimulation of 460 nm blue light.

The $Y_3Al_5O_{12}$:Ce nano-crystalline glass is prepared according to the flow chart shown in FIG. 1. The preparation process is as follows. 1.149 g analytically pure $Y(NO_3)_3.6H_2O$ (yttrium nitrate hexahydrate), 1.875 g analytically pure $Al(NO_3)_3.6H_2O$ (aluminium nitrate hexahydrate) and 0.0043 g analytically pure $Ce(NO_3)_3.6H_2O$ (cerium nitrate hexahydrate) are weighed with an analytical balance and dissolved in 10 ml of distilled water to prepare a mixed solution containing 0.3 mol/L $Y^{3+}$, 0.5 mol/L $Al^{3+}$ and 0.001 mol/L $Ce^{3+}$. The $SiO_2$ nano-porous glass is placed into the mixed solution and soaked for 1 h, taken out and air-dried under room temperature until the surface thereof becomes dry, and placed into an oven. The oven is heated to 400° C. at 10° C./min, to 900° C. at 15° C./min and to 1200° C. at 5° C./min, and maintained at 1200° C. to sinter for 2 h. The sintered glass is cooled down with the oven to room temperature before being taken out. After cutting and polishing, the $Y_3Al_5O_{12}$:Ce nano-crystalline glass is obtained. FIG. 2 is the emission spectrum of the $Y_3Al_5O_{12}$:Ce nano-crystalline glass under the stimulation of 460 nm blue light, which indicates that this glass emits yellow light under the stimulation of blue light.

Example 2

$Y_3Al_5O_{12}$:Ce nano-crystalline glass is a non-porous compacted $SiO_2$ glass having luminescent nano-crystallites of formula $Y_3Al_5O_{12}$:Ce dispersed therein.

The preparation process is as follows. 4.596 g analytically pure $Y(NO_3)_3.6H_2O$ (yttrium nitrate hexahydrate), 7.500 g analytically pure $Al(NO_3)_3.6H_2O$ (aluminium nitrate hexahydrate) and 0.868 g analytically pure $Ce(NO_3)_3.6H_2O$ (cerium nitrate hexahydrate) are weighed with an analytical balance and dissolved in 10 ml of distilled water to prepare a mixed solution containing 1.2 mol/L $Y^{3+}$, 2 mol/L $Al^{3+}$ and 0.2 mol/L $Ce^{3+}$. The $SiO_2$ nano-porous glass is placed into the mixed solution and soaked for 1 h, taken out and air-dried under room temperature until the surface thereof becomes dry, and placed into an oven. The oven is heated to 400° C. at 10° C./min, to 900° C. at 15° C./min, to 1200° C. at 5° C./min, and maintained at 1200° C. to sinter for 2 h. The sintered glass is cooled down with the oven to room temperature before being taken out. After cutting and polishing, the $Y_3Al_5O_{12}$:Ce nano-crystalline glass is obtained, which emits yellow light under the stimulation of blue light.

Example 3

$Y_3Al_5O_{12}$:Ce nano-crystalline glass is a non-porous compacted $SiO_2$ glass having luminescent nano-crystallites of formula $Y_3Al_5O_{12}$:Ce dispersed therein.

The preparation process is as follows. 2.746 g analytically pure $Y_2(SO_4)_3.8H_2O$ (yttrium sulfate octahydrate), 4.998 g analytically pure $Al_2(SO_4)_3.18H_2O$ (aluminium sulfate octa-decahydrate) and 0.202 g analytically pure $Ce(SO_4)_2.4H_2O$ (cerium sulfate tetrahydrate) are weighed with an analytical balance and dissolved in 10 ml of distilled water to prepare a mixed solution containing 0.9 mol/L $Y^{3+}$, 1.5 mol/L $Al^{3+}$ and 0.05 mol/L $Ce^{3+}$. The $SiO_2$ nano-porous glass is placed into the mixed solution and soaked for 8 h, taken out and air-dried under room temperature until the surface thereof becomes dry, and placed into an oven. The oven is heated to 400° C. at 10° C./min, to 900° C. at 15° C./min, to 1100° C. at 5° C./min, and maintained at 1100° C. to sinter for 4 h. The sintered glass is cooled down with the oven to room temperature before being taken out. After cutting and polishing, the $Y_3Al_5O_{12}$:Ce nano-crystalline glass is obtained, which emits yellow light under the stimulation of blue light.

Example 4

$Y_3Al_5O_{12}$:Ce nano-crystalline glass is a non-porous compacted $SiO_2$ glass having luminescent nano-crystallites of formula $Y_3Al_5O_{12}$:Ce dispersed therein.

The preparation process is as follows. 0.135 g analytically pure yttrium xoide ($Y_2O_3$), 0.102 g analytically pure $Al_2O_3$ (aluminium oxide) and 0.172 g analytically pure $CeO_2$ (cerium oxide) are weighed with an analytical balance and dissolved in 10 ml of nitric acid to prepare a mixed solution containing 0.12 mol/L $Y^{3+}$, 0.2 mol/L $Al^{3+}$ and 0.1 mol/L $Ce^{3+}$. The $SiO_2$ nano-porous glass is placed into the mixed solution and soaked for 10 h, taken out and air-dried under room temperature until the surface thereof becomes dry, and placed into an oven. The oven is heated to 400° C. at 10° C./min, to 900° C. at 15° C./min, to 1150° C. at 5° C./min, and maintained at 1150° C. to sinter for 2.5 h. The sintered glass is cooled down with the oven to room temperature before being taken out. After cutting and polishing, the $Y_3Al_5O_{12}$:Ce nano-crystalline glass is obtained, which emits yellow light under the stimulation of blue light.

Example 5

$Y_{1.5}Gd_{1.5}Al_5O_{12}$:Ce nano-crystalline glass is a non-porous compacted $SiO_2$ glass having luminescent nano-crystallites of formula $Y_{1.5}Gd_{1.5}Al_5O_{12}$:Ce dispersed therein.

The preparation process is as follows. 0.910 g analytically pure $YCl_3.6H_2O$ (yttrium chloride hexahydrate), 1.115 g analytically pure $GdCl_3.6H_2O$ (gadolinium chloride hexahydrate), 2.414 g analytically pure $AlCl_3.6H_2O$ (aluminium chloride hexahydrate) and 0.075 g analytically pure $CeCl_3.7H_2O$ (cerium chloride heptahydrate) are weighed with an analytical balance and dissolved in 10 ml of distilled water to prepare a mixed solution containing 0.3 mol/L $Y^{3+}$, 0.3 mol/L $Gd^{3+}$, 1 mol/L $Al^{3+}$ and 0.02 mol/L $Ce^{3+}$. The $SiO_2$ nano-porous glass is placed into the mixed solution and soaked for 10 h, taken out and air-dried under room temperature until the surface thereof becomes dry, and placed into an oven. The oven is heated to 400° C. at 10° C./min, to 900° C. at 15° C./min, to 1200° C. at 5° C./min, and maintained at 1200° C. to sinter for 2 h. The sintered glass is cooled down with the oven to room temperature before being taken out. After cutting and polishing, the $Y_{1.5}Gd_{1.5}Al_5O_{12}$:Ce nano-crystalline glass is obtained, which emits yellow light under the stimulation of blue light.

Example 6

$YGd_2Al_5O_{12}$:Ce nano-crystalline glass is a non-porous compacted $SiO_2$ glass having luminescent nano-crystallites of formula $YGd_2Al_5O_{12}$:Ce dispersed therein.

The preparation process is as follows. 0.676 g analytically pure $Y(CH_3COO)_3.4H_2O$ (yttrium acetate tetrahydrate), 1.804 g analytically pure $Gd(NO_3)_3.6H_2O$ (gadolinium nitrate hexahydrate), 3.75 g analytically pure $Al(NO_3)_3.6H_2O$ (aluminium nitrate hexahydrate) and 0.087 g analytically pure $Ce(NO_3)_3.6H_2O$ (cerium nitrate hexahydrate) are weighed with an analytical balance and dissolved in 10 ml of distilled water to prepare a mixed solution containing 0.2 mol/L $Y^{3+}$, 0.4 mol/L $Gd^{3+}$, 1 mol/L $Al^{3+}$ and 0.02 mol/L $Ce^{3+}$. The $SiO_2$ nano-porous glass is placed into the mixed solution and soaked for 24 h, taken out and air-dried under room temperature until the surface thereof becomes dry, and placed into an oven. The oven is heated to 400° C. at 10° C./min, to 900° C. at 15° C./min, to 1300° C. at 5° C./min, and maintained at 1300° C. to sinter for 5 h. The sintered glass is cooled down with the oven to room temperature before being taken out. After cutting and polishing, the $YGd_2Al_5O_{12}$:Ce nano-crystalline glass is obtained, which emits yellow light under the stimulation of blue light.

Example 7

$Gd_3Al_5O_{12}$:Ce nano-crystalline glass is a non-porous compacted $SiO_2$ glass having luminescent nano-crystallites of formula $Gd_3Al_5O_{12}$:Ce dispersed therein.

The preparation process is as follows. 2.706 g analytically pure $Gd(NO_3)_3.6H_2O$ (gadolinium nitrate hexahydrate), 3.75 g analytically pure $Al(NO_3)_3.6H_2O$ (aluminium nitrate hexahydrate) and 0.434 g analytically pure $Ce(NO_3)_3.6H_2O$ (cerium nitrate hexahydrate) are weighed with an analytical balance and dissolved in 10 ml of distilled water to prepare a mixed solution containing 0.6 mol/L $Gd^{3+}$, 1 mol/L $Al^{3+}$ and 0.1 mol/L $Ce^{3+}$. The $SiO_2$ nano-porous glass is placed into the mixed solution and soaked for 10 h, taken out and air-dried under room temperature until the surface thereof becomes dry, and placed into an oven. The oven is heated to 400° C. at 10° C./min, to 900° C. at 15° C./min, to 1300° C. at 5° C./min, and maintained at 1300° C. to sinter for 2 h. The sintered glass is cooled down with the oven to room temperature before being taken out. After cutting and polishing, the $Gd_3Al_5O_{12}$:Ce nano-crystalline glass is obtained, which emits yellow light under the stimulation of blue light.

Example 8

$Y_3Al_5O_{12}$:Ce nano-crystalline glass is a non-porous compacted $SiO_2$ glass having luminescent nano-crystallites of formula $Y_3Al_5O_{12}$:Ce dispersed therein.

The preparation process is as follows. 1.014 g analytically pure $Y(CH_3COO)_3.4H_2O$ (yttrium acetate tetrahydrate), 1.020 g analytically pure $Al(CH_3COO)_3$ (aluminium acetate) and 0.0407 g analytically pure $Ce(CH_3COO)_3.5H_2O$ (cerium acetate pentahydrate) are weighed with an analytical balance and dissolved in 10 ml of distilled water to prepare a mixed solution containing 0.3 mol/L $Y^{3+}$, 0.5 mol/L $Al^{3+}$ and 0.01 mol/L $Ce^{3+}$. The $SiO_2$ nano-porous glass is placed into the mixed solution and soaked for 24 h, taken out and air-dried under room temperature until the surface thereof becomes dry, and placed into an oven. The oven is heated to 400° C. at 10° C./min, to 900° C. at 15° C./min, to 1200° C. at 5° C./min, and maintained at 1200° C. to sinter for 4 h. The sintered glass is cooled down with the oven to room temperature before being taken out. After cutting and polishing, the $Y_3Al_5O_{12}$:Ce nano-crystalline glass is obtained, which emits yellow light under the stimulation of blue light.

What is claimed is:

1. A luminescent nano-crystalline glass for white LED source comprising a non-porous compacted $SiO_2$ glass in which luminescent nano-crystallites of formula $Y_xGd_{3-x}Al_5O_{12}$:Ce are dispersed, wherein $0 \leq x \leq 3$.

2. The luminescent nano-crystalline glass for white LED source according to claim 1, wherein the luminescent nano-crystalline glass is produced by using $SiO_2$ nano-porous glass as a substrate, and soaking the $SiO_2$ nano-porous glass in a solution containing ions for $Y_xGd_{3-x}Al_5O_{12}$:Ce; after the soaked $SiO_2$ nano-porous glass is sintered, the pores shrink to form the non-porous compacted $SiO_2$ glass encapsulating $Y_xGd_{3-x}Al_5O_{12}$:Ce luminescent nano-crystallites.

3. The luminescent nano-crystalline glass for white LED source according to claim 2, wherein the volume of the pores in the $SiO_2$ nano-porous glass represents 25~40% of the total volume of the $SiO_2$ nano-porous glass.

4. The luminescent nano-crystalline glass for white LED source according to claim 2, wherein the $SiO_2$ nano-porous glass is substantially composed of the following components in weight parts:

| | |
|---|---|
| $SiO_2$ | 94.0~98.0 |
| $B_2O_3$ | 1.0~3.0 |
| $Al_2O_3$ | 1.0~3.0. |

5. A method for manufacturing a luminescent nano-crystalline glass for white LED source, comprising the following steps:
   (1) using at least one of oxides, nitrates, chlorides, sulfates, acetates of $Y^{3+}$ and $Gd^{3+}$; at least one of oxides, nitrates, chlorides, sulfates, acetates of $Al^{3+}$; and at least one of oxides, nitrates, chlorides, sulfates, acetates of $Ce^{3+}$ as raw materials, dissolving the raw materials in a solvent to prepare a mixed solution of ions of luminescent compounds, wherein the concentration of $Al^{3+}$ is 0.5~2 mol/L, the sum of the concentrations of $Y^{3+}$ and $Gd^{3+}$ is 0.3~1.2 mol/L, and the concentration of $Ce^{3+}$ is 0.001~0.2 mol/L;
   (2) selecting a $SiO_2$ nano-porous glass having interconnected pores as a substrate, wherein the volume of the pores in the $SiO_2$ nano-porous glass represents 25~40% of the total volume of the $SiO_2$ nano-porous glass; and placing the $SiO_2$ nano-porous glass into the mixed solution obtained in step (1) and soaking for above 10 minutes;
   (3) gradually heating the soaked $SiO_2$ nano-porous glass to 1100~1300° C. and sintering for 1~5 hours, to give the luminescent nano-crystalline glass for white LED source.

6. The method for manufacturing the luminescent nano-crystalline glass for white LED source according to claim 5, wherein, when the raw materials are oxides of the ions, the solvent is selected from nitric acid, hydrochloric acid, sulfuric acid and acetic acid; and when the raw materials are nitrates, chlorides, sulfates or acetates of the ions, the solvent is water.

7. The method for manufacturing the luminescent nano-crystalline glass for white LED source according to claim 5, wherein, in step (2), the $SiO_2$ nano-porous glass is placed into the mixed solution obtained in step (1) and soaked for 30 min~5 h.

8. The method for manufacturing the luminescent nano-crystalline glass for white LED source according to claim 5, wherein, in step (3), the soaked $SiO_2$ nano-porous glass is first air-dried under room temperature until the surface thereof becomes dry, and then placed in an oven and gradually heated up to 1150~1250° C., and sintered at the same temperature for 2~4 hours, cooled down with the oven to room temperature, and taken out to obtain the luminescent nano-crystalline glass for white LED source, wherein, in the temperature ranges of below 400° C. and above 900° C., the heating rate shall be no higher than 15° C./min.

9. The method for manufacturing the luminescent nano-crystalline glass for white LED source according to claim 5, wherein the $SiO_2$ nano-porous glass is substantially composed of the following components in weight parts: $SiO_2$ 94.0~98.0, $B_2O_3$ 1.0~3.0, and $Al_2O_3$ 1.0~3.0.

10. The luminescent nano-crystalline glass for white LED source according to claim 3, wherein the $SiO_2$ nano-porous glass is substantially composed of the following components in weight parts:

| | |
|---|---|
| $SiO_2$ | 94.0~98.0 |
| $B_2O_3$ | 1.0~3.0 |
| $Al_2O_3$ | 1.0~3.0. |

* * * * *